United States Patent [19]

Lewis

[11] Patent Number: 5,791,739
[45] Date of Patent: Aug. 11, 1998

[54] SEAT BELT AND BELT ADAPTOR FOR SMALL PASSENGER AUTO SEAT

[75] Inventor: Donald J. Lewis, Scottsdale, Ariz.

[73] Assignee: Universal Propulsion Company, Inc., Phoenix, Ariz.

[21] Appl. No.: 786,616

[22] Filed: Jan. 17, 1997

[51] Int. Cl.$^6$ ............................................. B60R 21/00
[52] U.S. Cl. ................................... 297/471; 297/216.4
[58] Field of Search ............................ 297/216.11, 470, 297/471, 250.147, 474, DIG. 3, 216.1, 488, 256.15; 280/733, 808

[56] References Cited

U.S. PATENT DOCUMENTS 5,390,952   2/1995   Goor .
5,413,377   5/1995   Kamiyama et al. .

*Primary Examiner*—Milton Nelson, Jr.
*Attorney, Agent, or Firm*—Pennie & Edmonds LLP

[57] ABSTRACT

A small passenger restraint system in which a portable small passenger seat is placed on a vehicle seat and belted thereto. The small passenger seat has a passageway for accommodating the dual-anchored adjustable lap belt section of a belt system to initially secure the portable seat. The belt system also has a vertical section (with or without an inflatable portion) anchored below and above the vehicle seat adjacent the portable seat to stabilize the portable seat. The lap belt section is slidably connected to the vertical section so that upon inflation of a portion of that section the lap belt is tightened to further secure the portable seat.

7 Claims, 5 Drawing Sheets

5,791,739

1

SEAT BELT AND BELT ADAPTOR FOR SMALL PASSENGER AUTO SEAT

BACKGROUND OF THE INVENTION

Child seats positioned on automobile seats and secured using lap seat belts are old. Child seats have included air bags (U.S. Pat. No. 5,390,952) and shoulder straps (U.S. Pat. No. 5,413,377).

SUMMARY OF THE INVENTION

Broadly, the present invention is a small passenger restraint system in which a belt arrangement functions to secure a small passenger seat to the vehicle seat and in addition includes a belt portion to provide side protection and small seat stabilization of the small passenger seat in the event of a collision. The belt arrangement includes both an adjustable lap section and a vertical portion. A portion of the vertical belt section is preferably inflatable. The belt system functions to (1) shorten and tighten the belt arrangement upon inflation to further urge the small passenger seat against the vehicle seat and (2) to provide side protection for the small passenger.

The lap belt section of the belt system is readily adjustable to locate the inflatable vertical section of the belt system adjacent the outboard side of the small passenger seat to afford maximum side protection by the vertical belt section whether inflated or not.

DESCRIPTION OF THE PREFERRED EMBODIMENT

Figure 1:
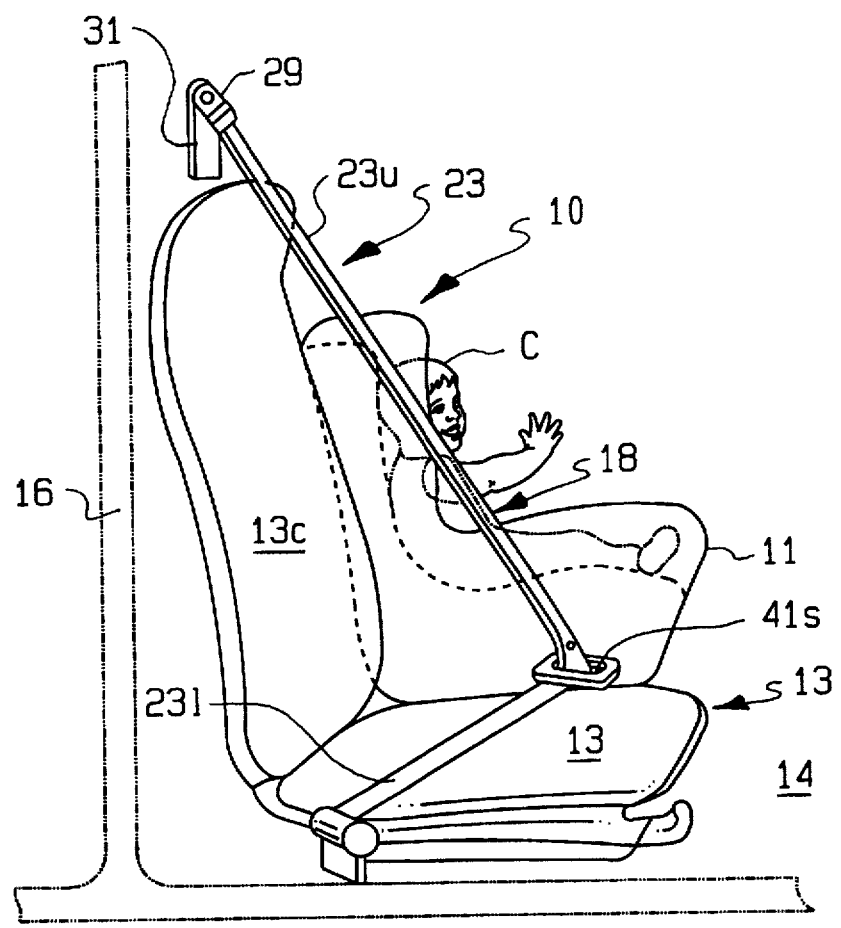
FIG. 1 is a side elevational view of a portable child's seat belted to an automobile seat using the belt system of the present invention.
Figure 2:
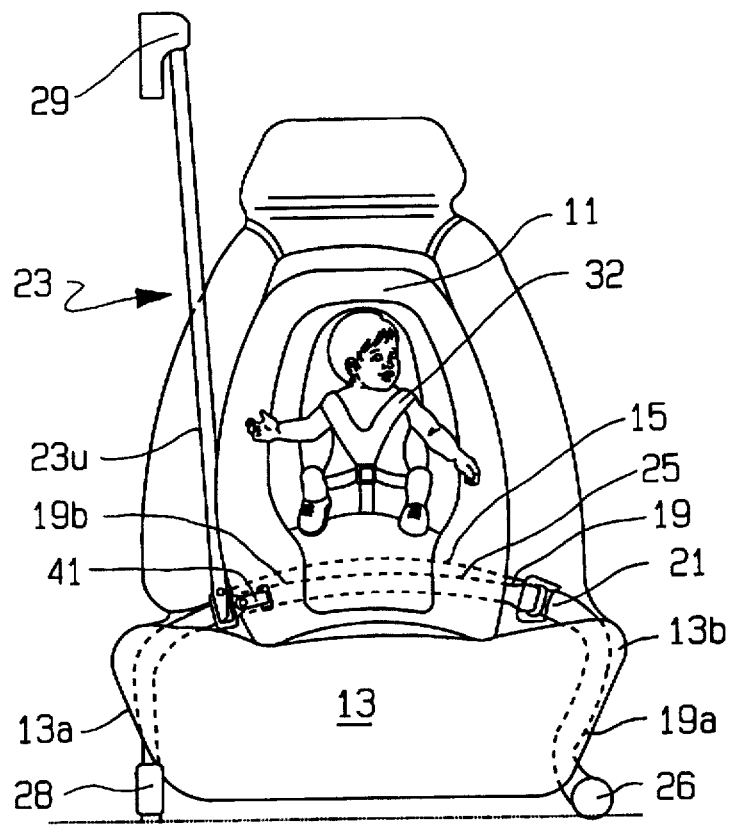
FIG. 2 is a front view of the child's seat, automobile seat, and belt system of FIG. 1.

In FIGS. 1 and 2, the child or other small passenger restraint system 10 includes a small portable seat 11, an automobile seat 13 mounted on automobile floor 14 and a belt system 18. Vehicle seat 13 includes back 13c. Outboard seat end 13a of seat 13 is adjacent the vehicle side including side pillar 16. Belt arrangement 18 comprises a lap belt section 19 including an adjustable length portion 25 and a vertical section 23 which section 23 includes upper inflatable portion 23u and lower non-inflatable portion 231.

Lap belt section 19 has two ends 19a and 19b. Lap belt end 19a is attached to floor anchor 26 adjacent inboard seat end 13b (FIG. 2). End 19b of lap belt section 19 is attached to tongue slot piece 41 (see also FIG. 5) for slidably receiving vertical belt section 23. Vehicle side belt retractor anchor 28, adjacent outboard seat end 13a, anchors vertical belt section 23 and also functions to permit belt unwinding and rewinding for length adjustment of vertical belt 23 during buckling-up and unbuckling.

Figure 5:
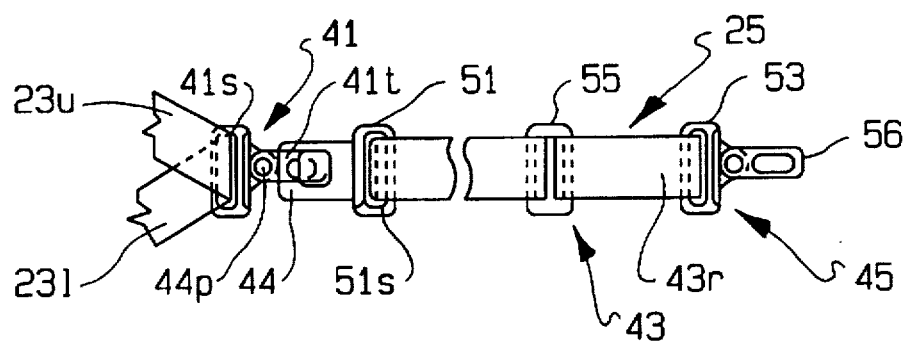
FIG. 5 is the portion of the lap belt section of the belt system providing length adjustment.

Vertical belt section 23 passes through tongue slot 41s and is anchored in upper belt anchor 29 (FIGS. 1 and 5). Inflator 31 is mounted adjacent anchor 29 for inflating a portion of belt section 23 when a collision occurs. Also shown is child C strapped into small seat 11 using harness 32 and further there is shown belt-receiving passageway 15 through small seat 11.

Figure 6:
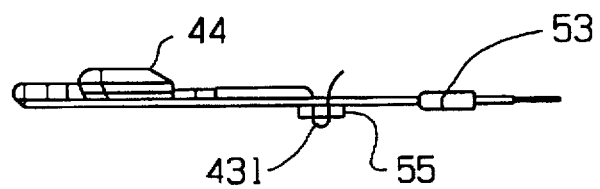
FIG. 6 is a side elevational view of the belt portion of FIG. 5.

Turning to FIGS. 5 and 6, adjustable belt portion 25 has central belt portion 43 and two (2) connector end units 44, 45. Central belt portion 43, made of belt fabric or webbing, and component end units 44, 45, which together determine the length of adjustable belt portion 25

With particular reference to FIG. 5, tongue slot piece 41, including tongue 41t and pivot pin 41p, is releasably connectable to adjustable belt portion 25. End connector 44 includes first loop 51 with slot 51s for receiving the belt central portion 43. Belt central portion 43 has right end portion 43r secured to second loop 53 of right end connector 45. Belt portion 43 passes through loop 51 and its left end portion 431 is secured to loop piece 55. End connector 45 includes tongue 56 for insertion into belt anchor 26. A suitable spring loaded release mechanism in connector 44 permits the belt operator to readily disconnect adaptor component 25 from belt portion 23. By moving left portion 431 through loop piece 55 and tightening it to attain the desired length, the length of component 25 is adjusted by the operator to vary the location of slotted tongue 41 from which shoulder belt section 23 emanates. When belt portion 23u inflates it shortens to locate inflatable belt portion 23u close to portable seat 11 as shown in FIG. 2.

In the operation of the restraint system, the portable seat 11 is placed on automobile seat 13, lap belt section 19 is threaded through belt-receiving passageway 15 of seat 11. Lap belt portion 25 of section 19 is adjusted in length, as described above, to locate tongue slot piece 41 adjacent the outboard side of child seat 11 which side is nearer automobile side pillar 16. Belt portion 23u whether inflatable or not stabilizes small seat 11 and protects its occupant. Vertical belt section 23 is passed through slot piece 41t and connected to upper anchor 29 thereby locating upper inflatable belt portion 23u adjacent seat 11.

Figure 3:
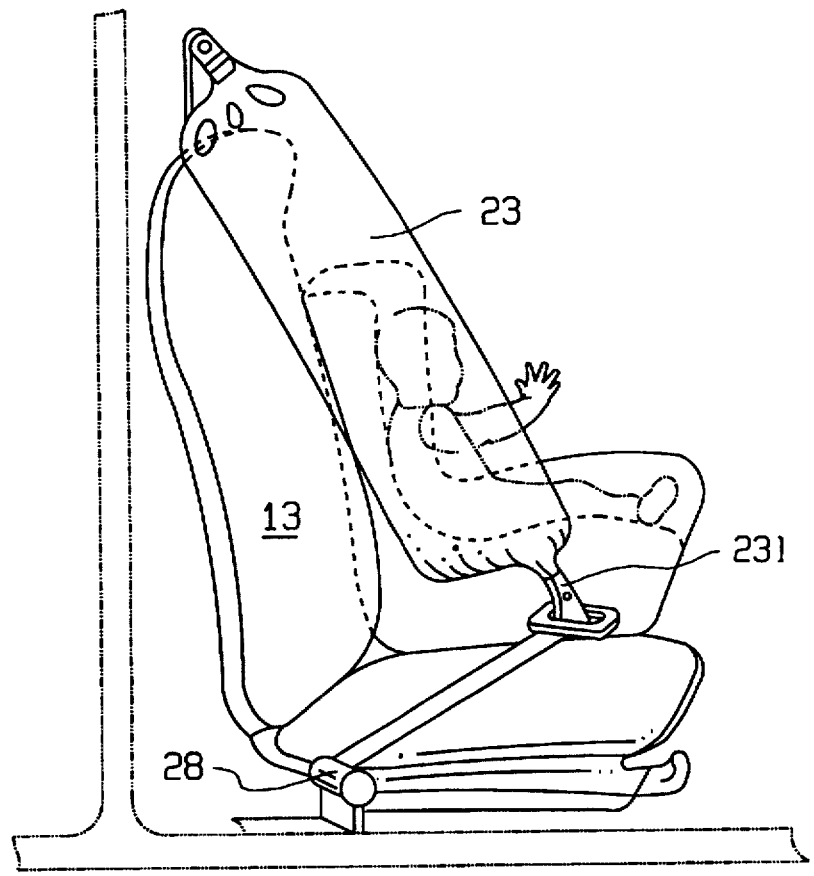
FIG. 3 is a view similar to FIG. 1 with the vertical section of the belt system inflated.
Figure 4:
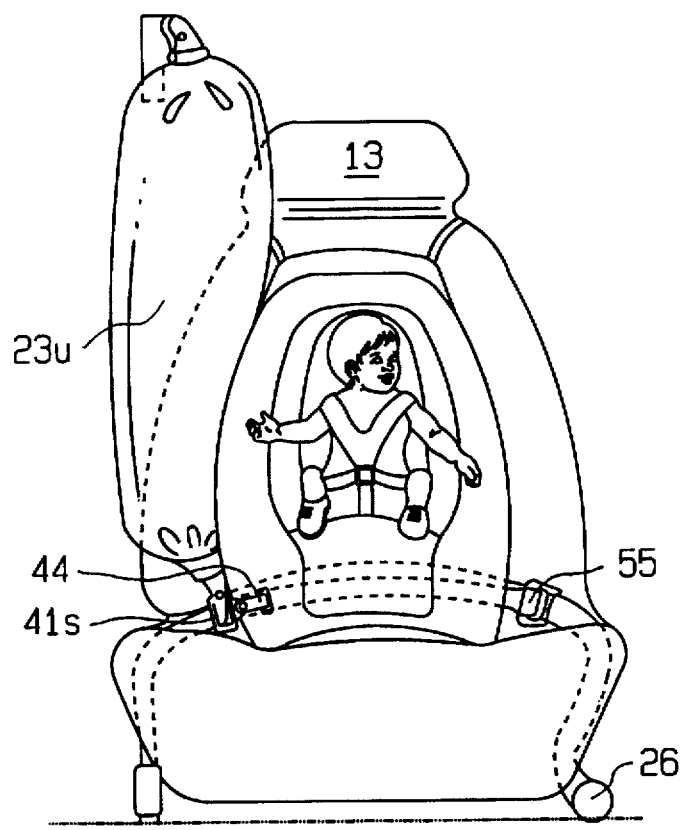
FIG. 4 is a view similar to FIG. 2 with the vertical section of the belt system inflated.

When a collision occurs inflator 31 is initiated by sensors and an ignitor (not shown) to inflate belt portion 23u (FIGS. 2 and 3) and lock-up belt retractor 28. When belt portion 23u inflates it shortens itself, causing slot piece 41 to be moved outboard and away from anchor 26 tensioning and stretching lap belt section 19 and, as a result, tightening child seat 11 against automobile seat 13. Inflated belt section 23u provides side protection to the occupant of seat 11.

I claim:

1. A small passenger restraint system for use in a vehicle including a vehicle seat with a first end adapted to be located adjacent one side of said vehicle and a second seat end adapted to be located remote from such vehicle side, a belt system and a portable small passenger seat having a passageway for receiving a portion of the belt system positionable on the vehicle seat passageway and beltable thereto, the restraint system further comprising a) a first belt anchor adjacent the first vehicle seat end and a second belt anchor adjacent the second vehicle seat end;

b) a lap belt section of the belt system positioned in the passageway of the small passenger seat having one end attached to the second belt anchor and the other end attached to a belt slot member;

c) a belt portion adjusting means forming part of the lap belt section for adjusting the length of such lap belt section to position the belt slot member adjacent the side of the small passenger seat; and d) a vertical inflatable belt section attached to the first belt anchor, passing slidably through the belt slot member and attached to a third belt anchor above the vehicle seat which vertical section includes an upper anchored portion whereby the vertical belt section is, through adjustment of the belt portion adjusting means, positionable adjacent the small passenger seat to protect the small passenger when inflated and by stabilizing such small passenger seat.

2. The small passenger restraint system of claim 1 in which the vertical inflatable belt section includes an inflatable portion and a non-inflatable portion.

3. The small passenger restraint system of claim 2 in which the inflatable belt section is above the belt slot member.

4. The small passenger restraint system of claim 1 in which the adjustable belt section includes a loop piece and a belt portion threaded therethrough for adjustment.

5. The small passenger restraint system of claim 1 in which the first belt anchor is a retractor.

6. The small passenger restraint system of claim 1 in which the belt slot member is positioned outside the passenger seat passageway.

7. The small passenger restraint system of claim 1 in which the said vertical belt section including its inflatable portion is attached between the first belt anchor and upper anchor means and in which said vertical belt section is capable of being shortened when inflated causing said vertical belt section to move away from the second belt anchor moving the belt slot member in the same direction to tighten the lap belt section thereby pressing the small passenger seat further against the vehicle seat.

* * * * *